No. 840,977. PATENTED JAN. 8, 1907.
A. P. WARNER & A. B. CADMAN.
GEAR.
APPLICATION FILED SEPT. 10, 1906.

Witnesses
Inventors
Arthur P. Warner
Addi Benjamin Cadman
By their Attorneys
Brown, Darby & Hopkins

UNITED STATES PATENT OFFICE.

ARTHUR P. WARNER AND ADDI BENJAMIN CADMAN, OF BELOIT, WISCONSIN, ASSIGNORS TO WARNER INSTRUMENT COMPANY, OF BELOIT, WISCONSIN, A CORPORATION OF WISCONSIN.

GEAR.

No. 840,977.      Specification of Letters Patent.      Patented Jan. 8, 1907.

Application filed September 10, 1906. Serial No. 333,969.

*To all whom it may concern:*

Be it known that we, ARTHUR P. WARNER and ADDI BENJAMIN CADMAN, citizens of the United States, residing at Beloit, county of Rock, State of Wisconsin, have made a certain new and useful Invention in Gears, of which the following is a specification.

This invention relates to gears; and the object is to provide a gear which is simple in construction, strong, durable, and economical to manufacture, and which may be readily cleared of any accumulation of dirt, mud, or the like in the teeth thereof.

Other objects of the invention will appear more fully hereinafter.

The invention consists substantially in the construction, combination, location, and arrangements of parts, all as will be more fully hereinafter set forth, as shown in the accompanying drawings, and finally pointed out in the appended claims.

Figure 1:
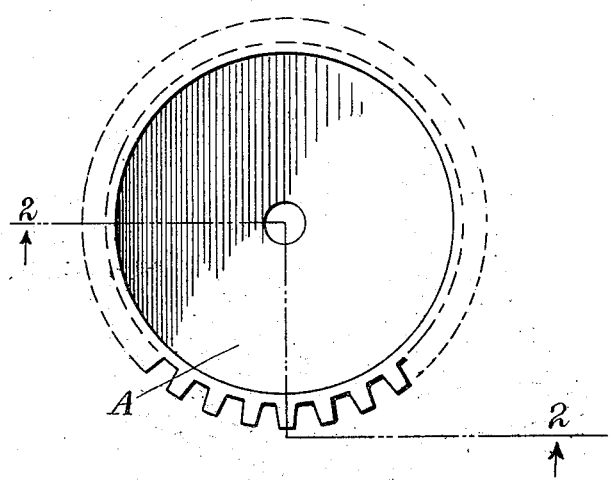
Figure 2:
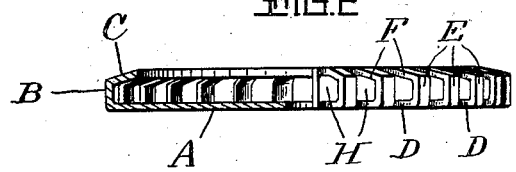
Figure 3:
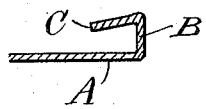

In the accompanying drawings, Figure 1 is a face view of a gear constructed in accordance with and embodying the principles of our invention, only a portion of the gear-teeth being shown around the circumference of the gear, the pitch and base lines of the remaining teeth being indicated by dotted lines. Fig. 2 is a view, partly in section on the line 2 2, Fig. 1, and partly in edge elevation, showing the teeth completely around the circumference. Fig. 3 is a broken detail view in section showing a slight modification.

In the use of gears in many situations—as, for instance, in connection with automobiles or other vehicles which operate in the open and over muddy roads—the gears frequently become clogged by the accumulation of mud and dirt in the teeth thereof, which accumulations become caked and in frigid weather become frozen, thereby greatly interfering with the proper operation of the gears and of the apparatus driven thereby if not actually breaking off the gear-teeth or twisting or injuring the shafts or other connections driven by the gear. These objections are particularly present and undesirable in the case of gears which drive the speed-indicating apparatus of automobiles, but are also encountered in gears employed in other situations and for other purposes.

It is among the special purposes of our present invention to avoid the objections noted and to provide a gear which is not only self-clearing of any accumulation of mud or dirt in the teeth thereof, but which is at the same time exceedingly simple in construction, strong and durable, and easily and economically manufactured.

In accomplishing the objects and purposes of our invention we employ a circular plate, of suitable material, such as and preferably steel. This plate is stamped or otherwise formed into a cup shape by bending the peripheral edge of the plate laterally with reference to the body to form a flange. The peripheral edge of the flange is then or simultaneously therewith bent inwardly or laterally with reference to the flange, so that said bent edge may lie approximately parallel with or in the general direction of the plane of the body of the plate, thereby forming an open channel. Gear-teeth are then cut or otherwise produced in the flanged edge of the plate or through the walls of the channel. This may be accomplished on any suitable or convenient gear-cutting machine. In forming the teeth the cuts are made radially through the body of the plate, at the peripheral edge thereof, and transversely through the flange, and radially through a portion only of the inwardly-bent lateral edge of the flange, leaving the extreme inner rim of such edge peripherally continuous, and therefore each tooth comprises a radial portion of the plate, a transverse portion of the flange, and a radial portion of the laterally-bent edge of the flange, all these portions being integral with each other. Since the strain on the teeth in the operation of the gear is transverse with respect to the teeth or in the direction of the circumferential length of the gear, and hence transverse to the direction of the bend which forms the flange and its lateral edge, it will be readily seen that the bending of the flange to form the channel serves to strengthen the teeth. It will also be seen that the teeth are braced at the ends of the loops which form them by being integrally connected to or formed with the body of the plate at one end and the body of the flange edge at the other end. It will also be seen that the bases of the teeth intermediate their integral ends are open, so that any dirt or mud which might otherwise collect and accumulate in the teeth will either pass freely through the open spaces at the center of the bases of the teeth or else be forced therethrough by the teeth of the intermeshing gear with which such gear coöperates, thereby preventing the collection or accumulation of dirt or mud in the teeth.

Referring to the drawings, reference-sign A designates the body of the gear, B the flange, and C the laterally-bent edge at the periphery of the flange. The edge C may be bent into substantial parallelism with the plane of the body A, or said edge may be slightly inclined relative to said flange outwardly, as shown in Fig. 2, or inwardly, as shown in Fig. 3. The teeth are formed of the integral portions D, E, and F of the body, flange, and flange edge, respectively, the extreme inner edge of the flange edge being peripherally continuous. The bending of the flange and of its edge in the manner described forms an open or substantially U-shaped channel which when the teeth are cut affords open spaces H at the center of the bases of the teeth through which accumulations or collections of mud or dirt may fall or be forced to clear the gear. By slightly inclining the edge C outwardly, as shown in Fig. 2, these openings or spaces H are made of increasing area, thereby facilitating the clearance of any accumulation of mud or dirt.

While we have shown and described a spur-gear as embodying our invention, we do not desire to be limited or restricted in this respect.

From the foregoing description it will be seen that we provide an exceedingly simple and efficient gear which is strong and durable and economical to manufacture and which is self-clearing of any accumulations of mud or dirt that might otherwise collect in and clog up the teeth.

Many variations and changes in the details of construction and arrangement might readily suggest themselves to persons skilled in the art and still fall within the spirit and scope of our invention. We do not desire, therefore, to be restricted and limited to the exact details shown and described.

Having now set forth the object and nature of our invention and a construction embodying the principles thereof, what we claim as new and useful and of our joint invention, and desire to secure by Letters Patent, is—

1. A gear having a body portion, the periphery of the body portion being bent to form an open channel said body portion and the wall of said channel having cuts therethrough to form gear-teeth therein.

2. A gear having a body portion, said body portion bent laterally at the periphery thereof to form a flange and the edge of the flange bent inwardly to form an open channel, the teeth being formed through the walls of the channel.

3. A gear having a body portion formed at its periphery into a substantially U-shaped channel, and gear-teeth formed of integrally-connected portions of the walls of said channel.

4. A gear formed from a circular plate, said plate having its peripheral edge bent to form an open channel, the plate adjacent the edge thereof and the wall of the channel being slotted through to form the gear-teeth.

In testimony whereof we have signed our names to this specification, in the presence of two subscribing witnesses, on this 21st day of August, A. D. 1906.

ARTHUR P. WARNER.
ADDI BENJAMIN CADMAN.

Witnesses:
  A. E. MOON,
  CHARLOTTE R. HOPPERSTAD.